United States Patent
Fuller et al.

(10) Patent No.: US 12,085,763 B2
(45) Date of Patent: Sep. 10, 2024

(54) OPTICAL BRIDGE

(71) Applicant: AETHER OPTICS, LLC, Pinehurst, NC (US)

(72) Inventors: Timothy Fuller, Pinehurst, NC (US); Kyle Winger, Fayetteville, NC (US)

(73) Assignee: AETHER OPTICS, LLC, Pinehurst, NC (US)

( * ) Notice: Subject to any disclaimer, the term of this patent is extended or adjusted under 35 U.S.C. 154(b) by 0 days.

(21) Appl. No.: 17/718,682

(22) Filed: Apr. 12, 2022

(65) Prior Publication Data
US 2022/0326445 A1 Oct. 13, 2022

Related U.S. Application Data

(60) Provisional application No. 63/258,119, filed on Apr. 13, 2021.

(51) Int. Cl.
| | | |
|---|---|---|
| *G02B 6/35* | (2006.01) | |
| *G02B 7/00* | (2021.01) | |
| *G02B 7/12* | (2021.01) | |
| *G02B 23/12* | (2006.01) | |
| *G02B 23/18* | (2006.01) | |

(52) U.S. Cl.
CPC ............ *G02B 6/3504* (2013.01); *G02B 6/358* (2013.01); *G02B 6/3582* (2013.01)

(58) Field of Classification Search
CPC .............. G02B 27/017; G02B 27/0176; G02B 27/0172; G02B 2027/0178; G02B 2027/0134; G02B 2027/0154; G02B 7/12
See application file for complete search history.

(56) References Cited

U.S. PATENT DOCUMENTS

| 4,449,787 A | 5/1984 | Burbo et al. |
| 11,556,011 B2 * | 1/2023 | Nakamura ............. G02C 3/003 |
| | (Continued) | |

FOREIGN PATENT DOCUMENTS

| EP | 643314 A2 * | 3/1995 | ........... G02B 27/017 |
| JP | H0886975 A * | 4/1996 | |
| | (Continued) | | |

OTHER PUBLICATIONS

EP-643314-A2 (Year: 1995).*
(Continued)

*Primary Examiner* — Ryan A Lepisto
*Assistant Examiner* — Erin D Chiem
(74) *Attorney, Agent, or Firm* — BURR & FORMAN LLP

(57) ABSTRACT

Optical bridges including a bridge body configured to be mounted directly or indirectly onto a head-worn device and at least one rail operatively engaged with the bridge body, in which the at least one rail having a first end and a second end. The optical bridges also include a first stopblock located at or proximate to the first end and a second stopblock located at or proximate to the second end. The at least one rail has a first side portion located between the first stopblock and the bridge body and a second side portion located between the second stopblock and the bridge body. Systems including an optical bridge and one or more optical devices directly or indirectly releasably coupled to the optical bridge are also provided.

34 Claims, 13 Drawing Sheets

(56) References Cited

U.S. PATENT DOCUMENTS

| | | | | |
|---|---|---|---|---|
| 2004/0212776 | A1* | 10/2004 | Spitzer | G02C 7/08 |
| | | | | 351/41 |
| 2012/0069445 | A1* | 3/2012 | Kobayashi | G02B 27/0176 |
| | | | | 359/630 |
| 2012/0069556 | A1 | 3/2012 | Kobayashi | |
| 2014/0327962 | A1* | 11/2014 | Teetzel | G02B 23/125 |
| | | | | 359/409 |

FOREIGN PATENT DOCUMENTS

| | | | | |
|---|---|---|---|---|
| WO | 20070145787 | A2 | 12/2007 | |
| WO | WO-2007145787 | A2 * | 12/2007 | G02B 23/18 |
| WO | 20110132485 | A1 | 10/2011 | |

OTHER PUBLICATIONS

WO-2007145787-A2 (Year: 2011).*
International Search Report and Written Opinion of corresponding International Application No. PCT/US2022/024517, mailed on Jul. 15, 2022, all pages cited in its entirety.

* cited by examiner

SECTION B-B

OPTICAL BRIDGE

TECHNICAL FIELD

Embodiments of the presently-disclosed invention relate generally to optical bridges including a bridge body having at least one rail operatively engaged with the bridge body, in which the one or more optical devices (e.g., night vision device(s)) may be directly or indirectly attached to the at least one rail such that the position of one or more optical devices along the length of the at least one rail may be readily adjusted by a user.

BACKGROUND

Current approaches to mating an optical device (e.g., a night vision device) to a head-worn device (e.g., a helmet or hat) utilize an accessory device commonly called a "bridge" to allow the connection of the optical device to a head-worn device. These bridges also allow for required adjustments in pupillary distance in the case of binocular or multi-ocular devices, and distance adjustment between the center line of the optical device and head-worn attachment in the monocular configuration. Current bridges typically use a relatively heavy metal fabrication utilizing hinges, or threaded rods and gears, or a combination thereof to make the required adjustment.

In this regard, there remains a need in the art for an optical bridge that enables the attachment and adjustment of any optical device to a head-worn device or helmet-worn apparatus.

SUMMARY OF INVENTION

One or more embodiments of the invention may address one or more of the aforementioned problems. Certain embodiments according to the invention provide an optical bridge including a bridge body configured to be mounted directly or indirectly onto a head-worn device and at least one rail operatively engaged with the bridge body, in which the at least one rail has a first end and a second end. The optical bridge may also include a first stopblock, which may be releasably attached to the at least one rail, located at or proximate to the first end and a second stopblock, which may be releasably attached to the at least one rail, located at or proximate to the second end. The at least one rail may have a first side portion located between the first stopblock and the bridge body and a second side portion located between the second stopblock and the bridge body.

In another aspect, the present invention provides a system including an optical bridge and an optical device that is directly or indirectly coupled to the optical bridge. In accordance with certain embodiments of the invention, the optical bridge may include a bridge body configured to be mounted directly or indirectly onto a head-worn device and at least one rail operatively engaged with the bridge body, in which the at least one rail has a first end and a second end. The optical bridge may also include a first stopblock, which may be releasably attached to the at least one rail, located at or proximate to the first end and a second stopblock, which may be releasably attached to the at least one rail, located at or proximate to the second end. The at least one rail may have a first side portion located between the first stopblock and the bridge body and a second side portion located between the second stopblock and the bridge body. The optical device may be directly or indirectly mounted onto the at least one rail.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 8:
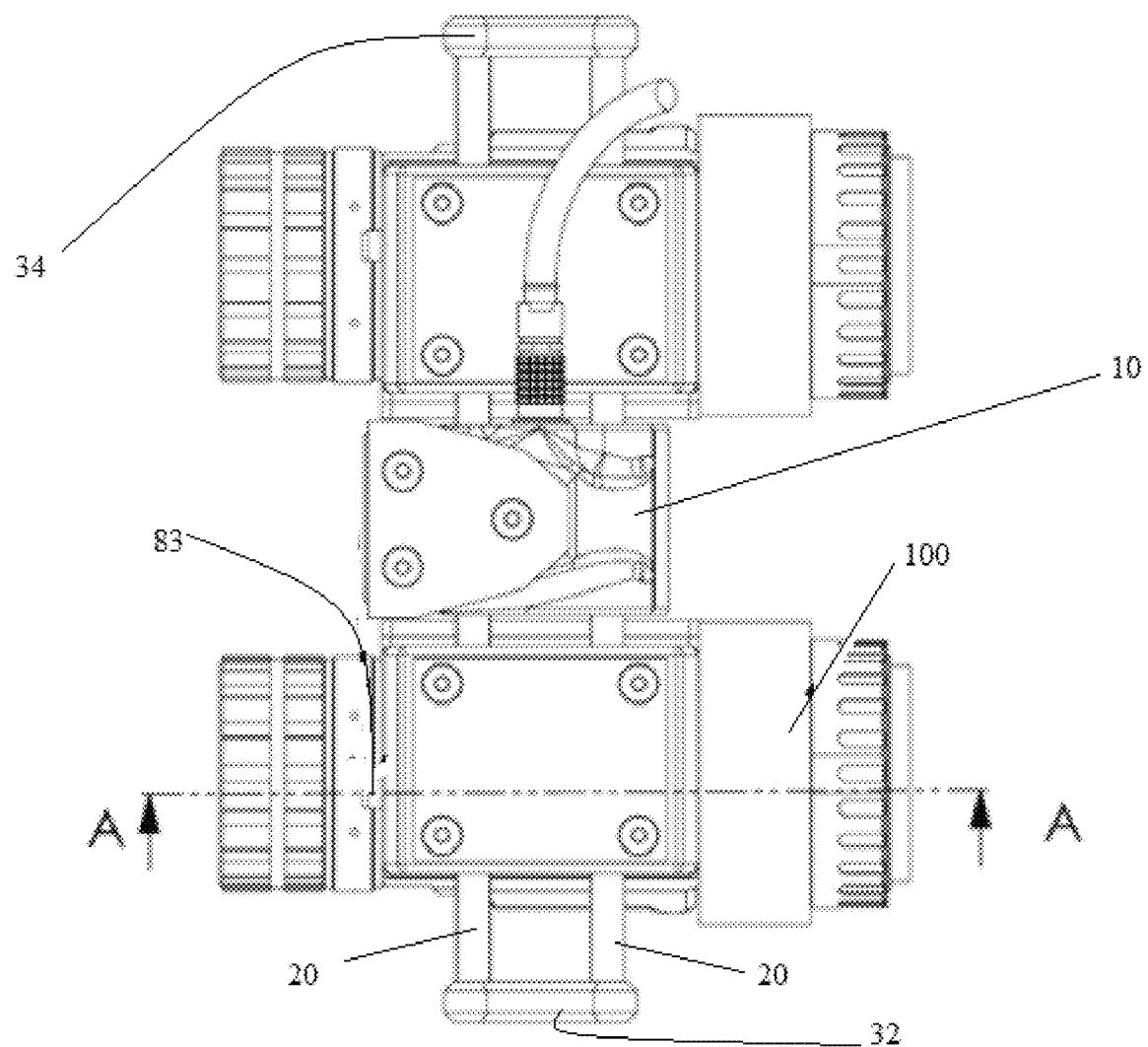
Figure 9:
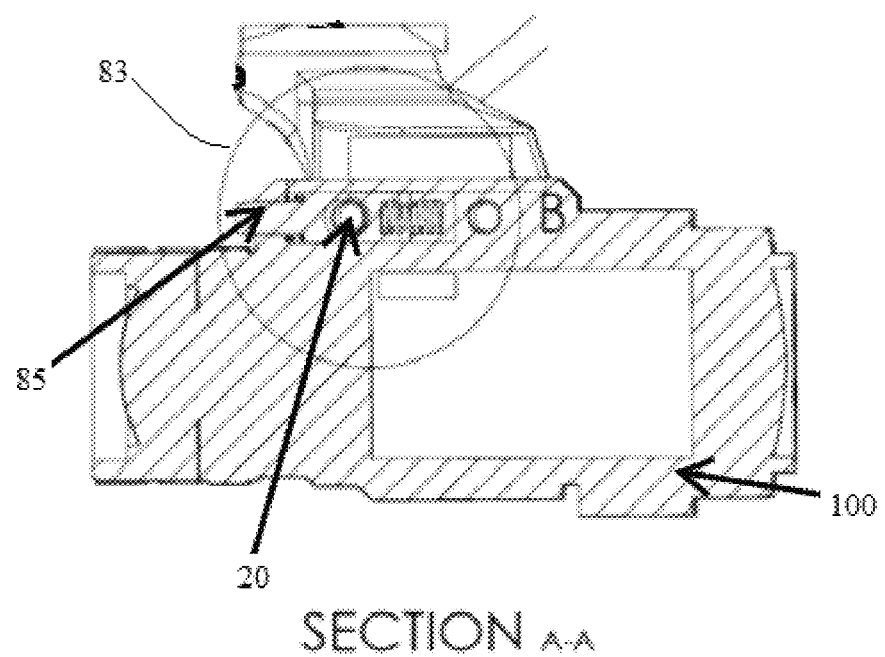
Figure 10:
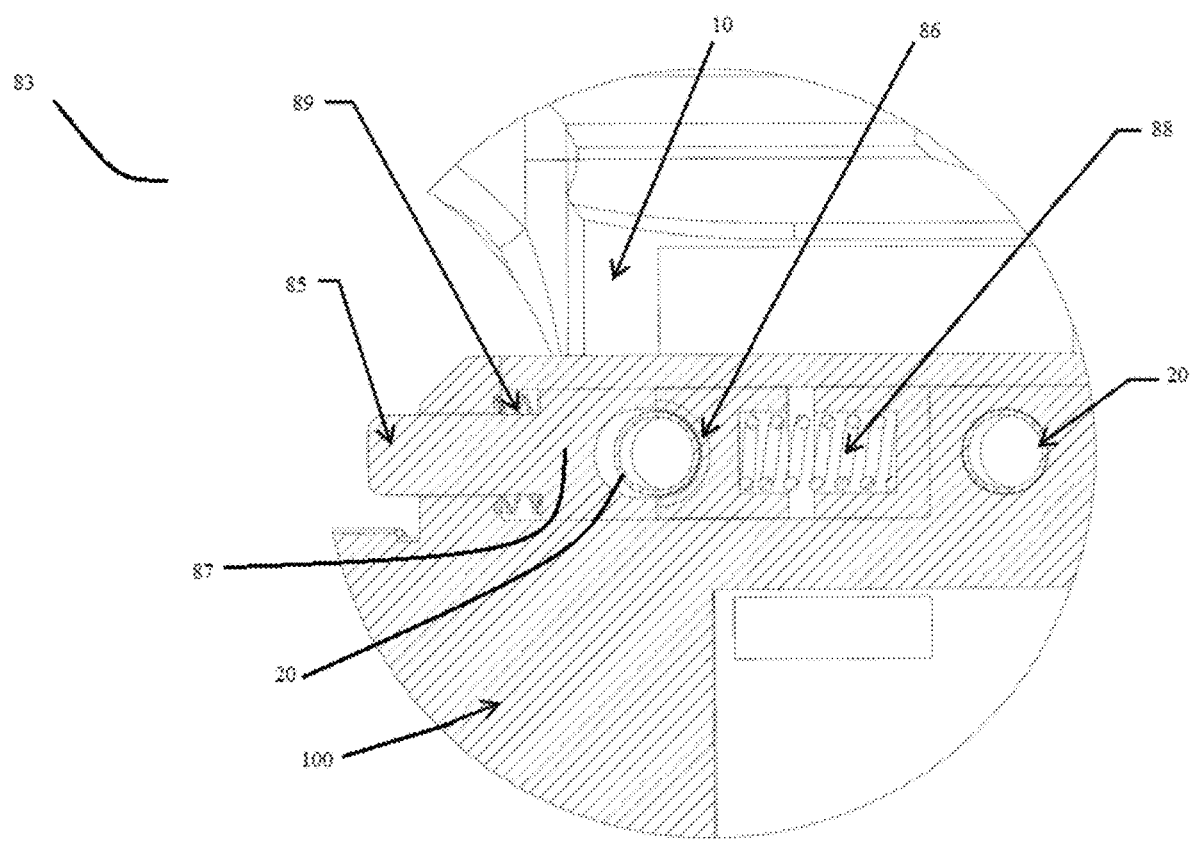
Figure 11:
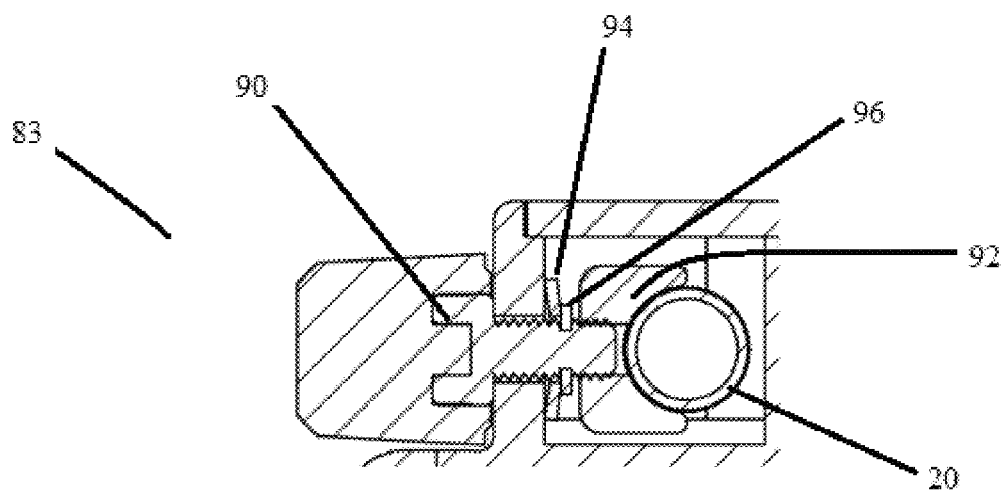
Figure 12:
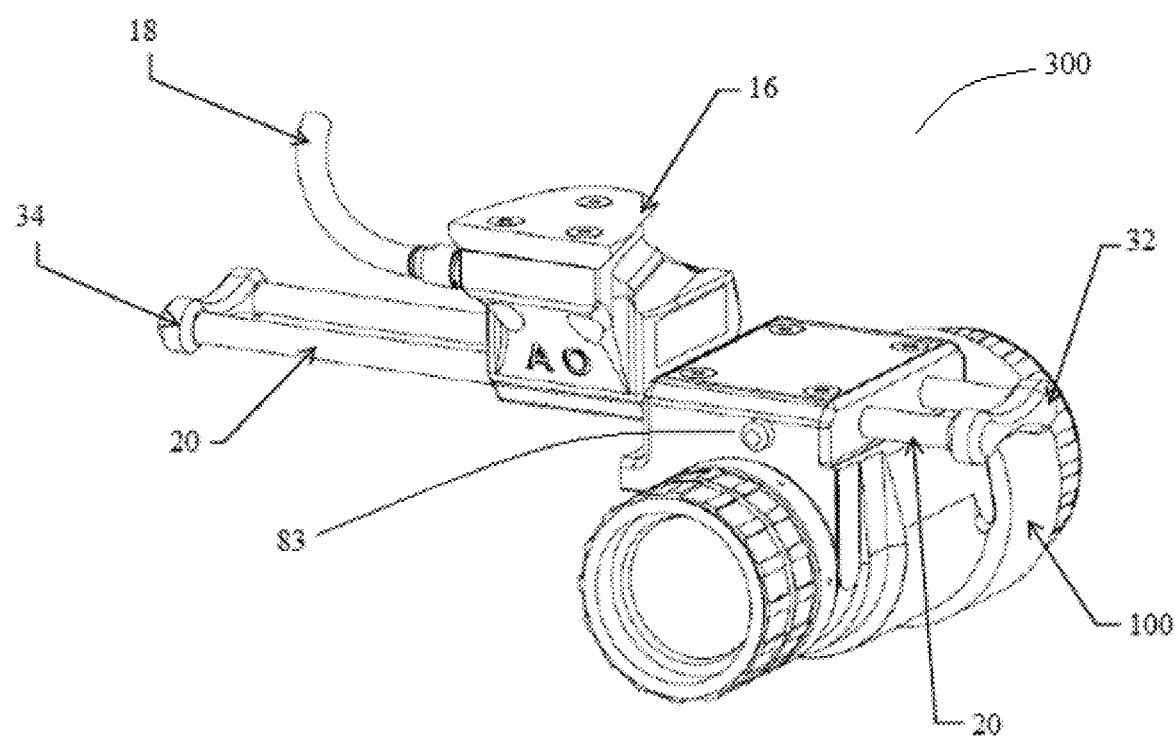
Figure 13:
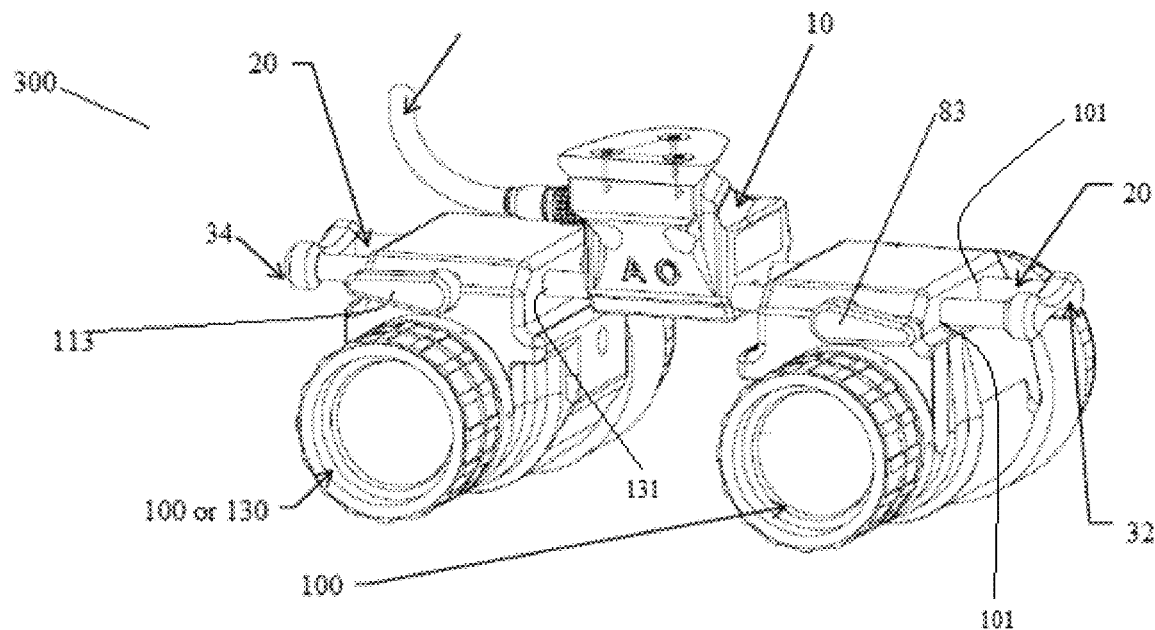
Figure 14:
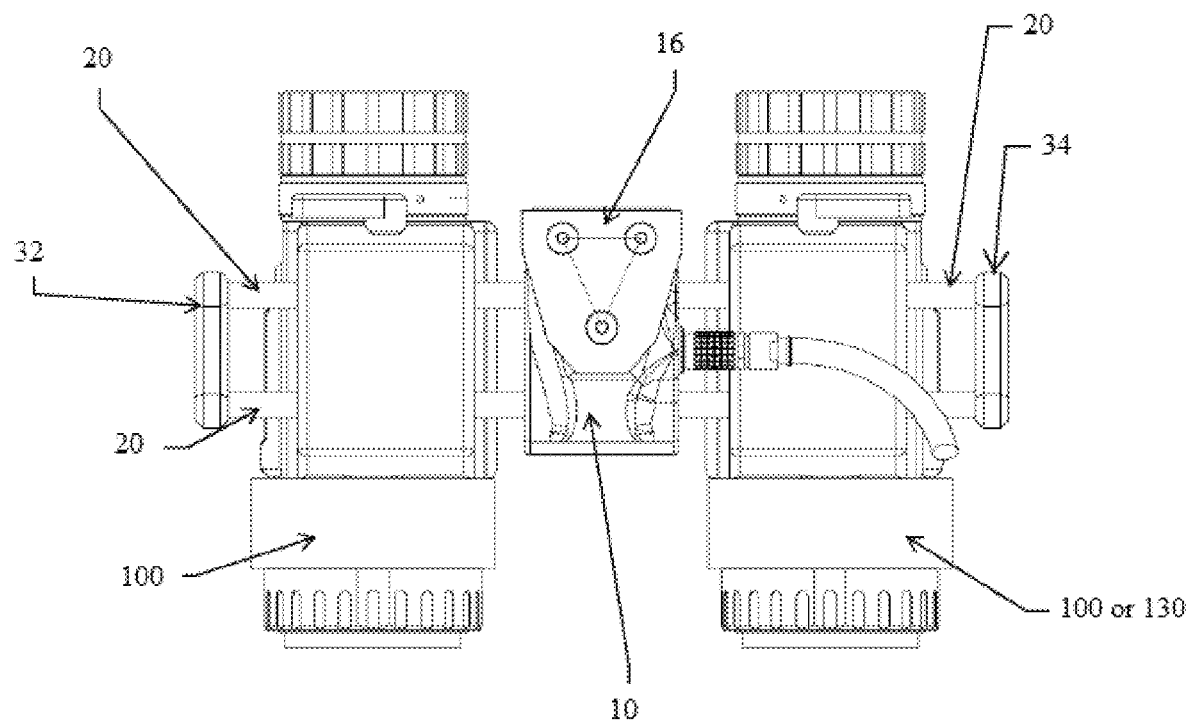
Figure 15:
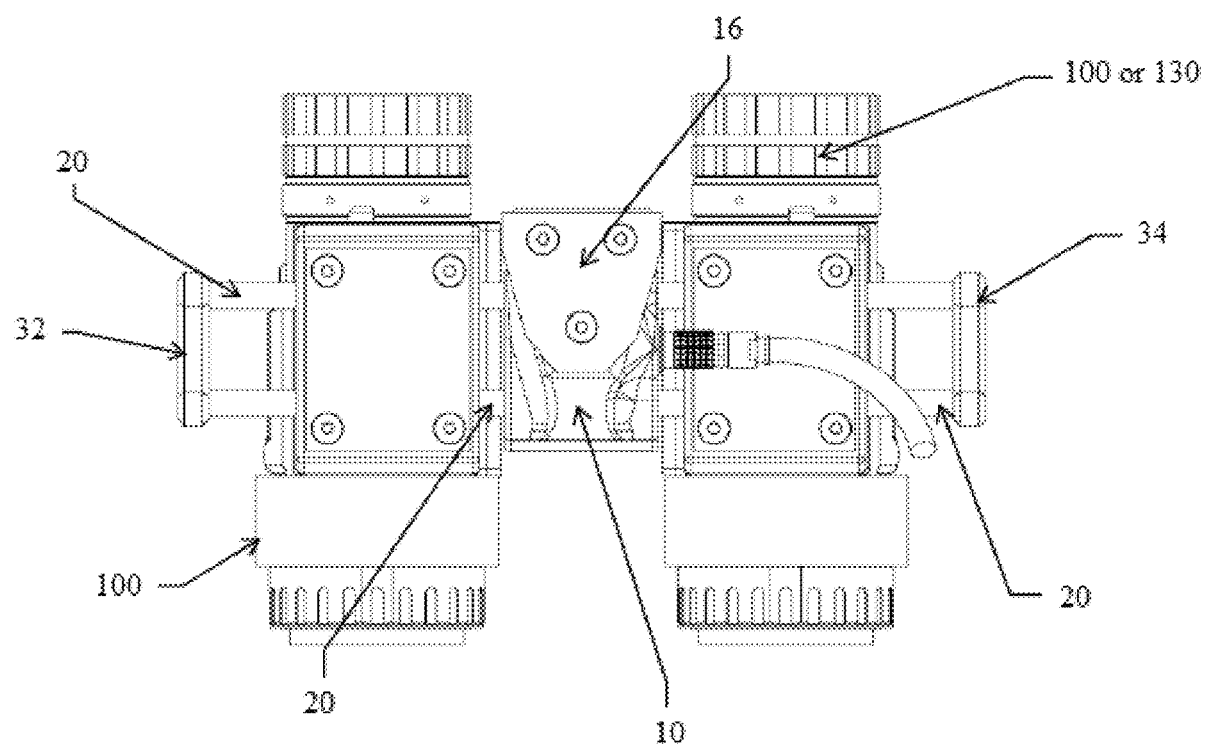
Figure 16:
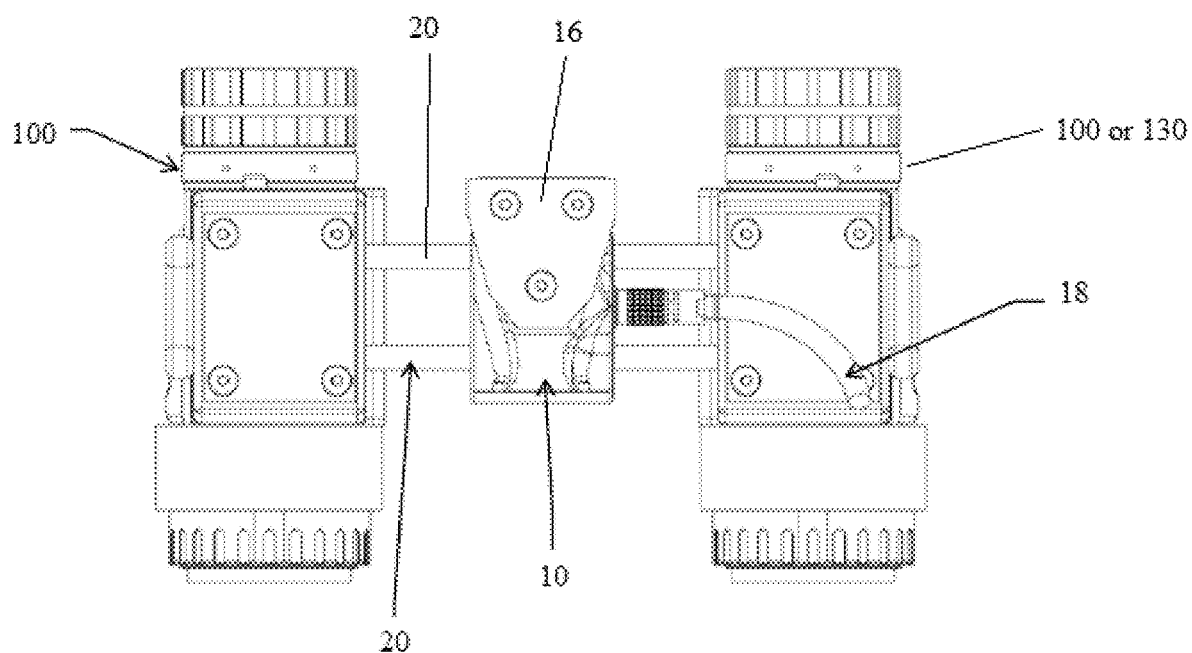

FIG. 8 illustrates a system including an optical bridge coupled to an optical device and illustrating a location of a position-securing device, which may be incorporated as part of the optical device (e.g., optical device designed to engage or couple with the optical bridge) or as part of an adapter pod (e.g., for general purpose optical devices that are not specifically designed or configured to engage or couple with the optical bridge) in accordance with certain embodiments of the invention;

FIG. 9 illustrates a cross-sectional view of FIG. 8;

FIG. 10 illustrates and expanded view of a position-securing device shown in FIG. 9;

FIG. 11 illustrates another position-securing device that may be incorporated as part of the optical device (e.g., optical device designed to engage or couple with the optical bridge) or as part of an adapter pod (e.g., for general purpose optical devices that are not specifically designed or configured to engage or couple with the optical bridge) in accordance with certain embodiments of the invention;

FIG. 12 illustrates a system including an optical device coupled to an optical bridge in accordance with certain embodiments of the invention;

FIG. 13 illustrates an additional system including an optical device coupled to an optical bridge, in which the position-securing devices are embodied as rotatable levers operably coupled to rail-engaging components that either engage and secure the optical device(s) to a particular location along the rail(s) of the optical bridge or are disengaged and allow the optical device(s) to freely slide along the length of the rail(s) of the optical bridge in accordance with certain embodiments of the invention;

FIG. 14 illustrates a top view of a system including an optical device(s) secured to an optical bridge in accordance with certain embodiments of the invention;

FIG. 15 illustrates the system of FIG. 14 in which the interpupillary distance is a minimum in accordance with certain embodiments of the invention; and FIG. 16 illustrates the system of FIG. 14 in which the interpupillary distance is a maximum in accordance with certain embodiments of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to an optical bridge and a method of bridging between head-worn devices (e.g., helmets, hats, etc.) and an optical device(s) that simplifies the attachment and/or positional adjustment of the optical device(s) as well as lightening the weight of the optical bridge. In general, the optical bridge may utilize one or more rails, which may be formed from a lightweight material (e.g., fiber-reinforced composite material, metal, or metal alloy). The one or more rails, for example, may be fixed in a bridge body of the optical bridge, and protrude through mating tunnel(s) in the body or frame of the optical device or through adapter pods that indirectly couple the optical device to the one or more rails. The mating tunnels or the adapter pods, in accordance with certain embodiments of the invention, may allow necessary positional adjustments (e.g., modify the interpupillary distance), and provide a simple mechanical device that permits a user selected position to be set as desired by sliding the optical device along the length of the one or more rails. In this regard, for example, the optical bridge may provide a lighter, and therefore more desirable optical mounting apparatus. As with any apparatus worn on the head, weight is a limiting factor in the usefulness of the device, particularly as the weight of the combined optical device(s), bridge, and mounting structure generates a torquing force that is transmitted to the user's head and neck such that even a few ounces saved offers significantly improved performance. In accordance with certain embodiments of the invention, for example, the optical bridge provides increased simplicity and allows for reduced weight while accomplishing industry standard adjustments for the application.

In accordance with certain embodiments of the invention, optical devices may be designed to fit the embodied rail-based optical bridge (e.g., directly mounted onto the one or more rails of the optical bridge), or optical devices can utilize purpose-built adapters (e.g., adapter pods) that interface between and indirectly couple the one or more rails and the optical device without any modification to the optical device body. Additionally, in practically all use-conditions for head-worn optical devices it is desirable to reduce the weight of the head gear and all accessories, which in accordance with certain embodiments of the invention is provided though other benefits are also evident as a byproduct of the reduced weight associated with the optical bridge such as simplicity that typically results in reduced production and maintenance costs and may also exhibit reduced complexity in operation with fewer parts and joints providing increased stiffness. In accordance with certain embodiments of the invention, the optical bridge may function equally for monocular and multi-channel configurations (e.g., night vision binoculars and/or panoramic devices), and other accessories such as flashlights, optical pointers and other desirable applications.

In accordance with certain embodiments of the invention, the optical bridge provides a mechanism for adjusting an interpupillary distance between two optical channels (e.g., two separate monocular night vision device, a binocular night vision device, etc.) utilizing two discrete states. The two discrete states may be defined as an engaged state and a disengaged state to fix or release an optical device (or other attachment) to translate along the rail(s) of the optical bridge. For example, the adjustment of the interpupillary distance may involve a disengaged and engaged state, in which the engaged state fixes the optical device/attachment in place relative to the bridge body while the disengaged state fully releases the optical element/attachment which allows it to freely slide or translate along the rail(s) (e.g., an unconstrained or uncaptured adjustment. In this regard, the optical bridge may provide the ability to fully disengage (e.g., uncapture or release) the mechanism (e.g., a position-securing device as described and disclosed herein) utilized for adjusting the interpupillary distance such and an unconstrained sliding or translation of one or more optical channels can slide or translate along the at least one rail. This feature, in accordance with certain embodiments of the invention, differs from several industry-available method that achieve adjustment via a threaded rod (e.g., lead screw, ACME screw, traditional screw, etc.) that keep the optical device constrained throughout adjustment. In this regard, the optical bridge in accordance with certain embodiments may be devoid of any threaded rails.

In accordance with certain embodiments of the invention, the mechanism (e.g., a position-securing device as described and disclosed herein) utilized for adjusting the interpupillary distance may be contained within the optical device itself or within one or more adjustable pods (e.g., adapter pods), in which the mechanism utilized for adjusting the interpupillary distance slides or translates with the optical device/attachment. In this regard, for instance, the mechanism utilized for adjusting the interpupillary distance is not part of the bridge structure as is typical. Instead, the mechanism utilized for adjusting the interpupillary distance may be part of the optical device (e.g., frame or housing of an optical device) or as part of an adjustable pod that couples the optical device to the one or more rails. This configuration, for example, allows the mechanism utilized for adjusting the interpupillary distance to slide or translate with the optical device (or other attachment) which enables the mechanism utilized for adjusting the interpupillary distance to release and recapture the optical device (or other attachment) at any point within its adjustment range along the at least one rail (e.g. a plurality of rails, such as 2, 3, 4, or 5 individual rails). The ability to release (fully disengage) enables quick adjustment via free translation the along one or more rails.

In accordance with certain embodiments of the invention, the optical bridge may comprise an integrated non-integrated configuration that each support mono-, bino-, and pano-optical devices with the same optical bridge. That is, the optical bridge may support mono-, bino-, and pano- configurations of optical devices for integrated (e.g., optical device directly mounted and/or engaged with the at least one rail) and non-integrated formats (e.g., adapter pods). In this regard, embodiments in which the at least one rail pierces (e.g., passes through) the optical device body (e.g., frame) directly provides improved operational simplicity and weight savings. Such embodiments, for example, also permit the mechanism (e.g., a position-securing device whether incorporated in an adapter pod or as part of an optical device) utilized for adjusting the interpupillary distance to be removed from the optical bridge and located in the optical device, which permits full disengagement and free translation. Regardless of whether the optical bridge is provided as an integrated or non-integrated configuration, the mechanism utilized for adjusting the interpupillary distance may slide or translate with the optical device whenever the interpupillary distance is adjusted. In accordance with certain embodiments of the invention, for example, the components (as described herein) that achieve retention of a particular interpupillary distance may not be part of the optical bridge. Using components of the optical bridge to achieve interpupillary distance adjustment would require that the optical element remains captured at all states of adjustment. In this regard, prior art designs cannot fully disengage because the mechanism utilized for adjusting the interpupillary distance is integral to the bridge construction and thus cannot reasonably translate when interpupillary distance is adjusted which means it cannot reasonably recapture the optical element once released. To the contrary, certain embodiments of the invention, provide the ability to release and re-fix or re-secure an optical device at any point along the length of the at least one rail (e.g., as opposed to keeping it captured/fixed at all positions and adjusting via constrained motion along a threaded element or due to the rotation of a threaded element).

The ability to the mechanism utilized for adjusting the interpupillary distance to freely translate along the one or more rails, permits the removal of the mechanism utilized for adjusting the interpupillary distance from the optical bride and configuring it with the optical device, the adjustable pod(s), or some other attachment. Accordingly, the mechanism utilized for adjusting the interpupillary distance translates with the optical device when the interpupillary distance is adjusted and is able to release (e.g., unengaged state with respect to the at least one rail) and recapture (e.g., engaged or fixed state with respect to the at least one rail) the optical device at any point along the at least one rail. Thus, a two-state mechanism (e.g., engaged/disengaged) provides a viable solution, in which the disengaged state permits unconstrained translation along the at least one rail.

In accordance with certain embodiments of the invention, the optical bridge may be devoid of any threaded rails. For example, the optical bridge may comprise two or more unthreaded rails (e.g., each devoid of threading). In accordance with certain embodiments of the invention, the one or more rails may be structural elements of the optical bridge that define certain features of the optical bridge and provide structural integrity to the overall optical bridge. In this regard, the optical bridge in accordance with certain embodiments of the invention may not be configured in a manner having a frame or superstructure that provide structural integrity to which one or more rails or threaded elements are mounted as may be the case with some existing optical bridges.

In one aspect, certain embodiments according to the invention provide an optical bridge including a bridge body configured to be mounted directly or indirectly onto a head-worn device and at least one rail operatively engaged with the bridge body, in which the at least one rail has a first end and a second end. The optical bridge may also include a first stopblock, which may be releasably attached to the at least one rail, located at or proximate to the first end and a second stopblock, which may be releasably attached to the at least one rail, located at or proximate to the second end. The at least one rail may have a first side portion located between the first stopblock and the bridge body and a second side portion located between the second stopblock and the bridge body.

Figure 1:
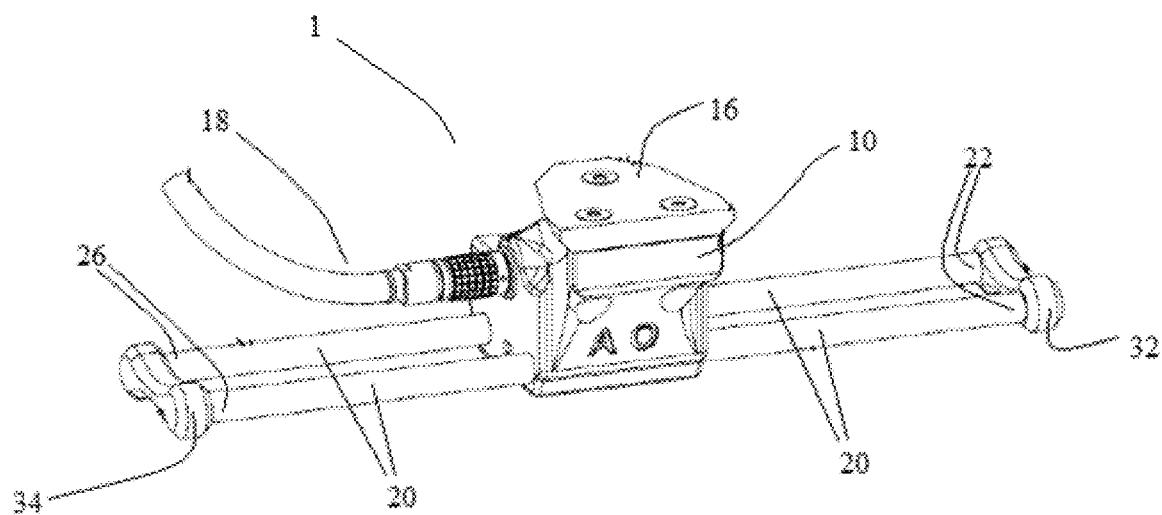
FIG. 1 illustrates an optical bridge in accordance with certain embodiments of the invention.

FIG. 1, for instance, illustrates an optical bridge 1, in accordance with certain embodiments of the invention, that includes a bridge body 10 as well as a pair of rails 20 that extend through the bridge body. Each of the rails 20 include a first end 22 and a second end 26. As also illustrated in FIG. 1, the optical bridge 1 include a first stopblock 32, which may be releasably attached to the at least one rail, located at or proximate to the first end 22 and a second stopblock 34, which may be releasably attached to the at least one rail, located at or proximate to the second end 26. As also shown in FIG. 1, the optical bridge may include a customary mounting plate 16 as well as remote power supply wiring and power connectors 18.

Figure 2:
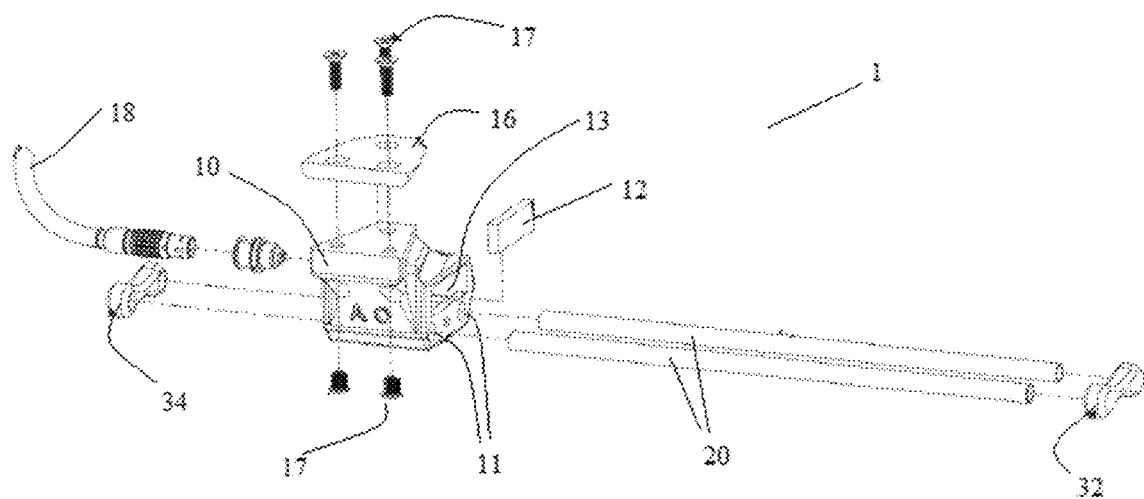
FIG. 2 illustrates and exploded view of the optical bridge of FIG. 1.

FIG. 2 illustrates and exploded view of the optical bridge of FIG. 1. As illustrated in FIG. 2, the bridge body 10 includes a number of through-channels 11 that may correspond to the number of rails 20. In this regard, the rails 20 may be inserted and passed through the through-channels, such that the rails 20 have a first side portion 24 (shown in FIG. 3) located between the first stopblock 32 and the bridge body 10 and a second side portion 28 (shown in FIG. 3) located between the second stopblock 34 and the bridge body 10. As also shown in FIG. 2, the bridge body 10 may include an access panel 20 that may be removed to access in internal compartment or chamber. As also illustrated by FIG. 2, the mounting plate 16 may be coupled to the bridge body 10 by one or more screws and/or inserts 17.

In accordance with certain embodiments of the invention, the at least one rail may comprise from 1 to about 10 rails, such as at least about any of the following: 1, 2, 3, 4, and 5 rails, and/or at most about any of the following: 10, 9, 8, 7, 6, and 5 rails. Additionally or alternatively, the at least one rail may have a circular cross-section or a non-circular cross-section. For example, the at least one rail may comprise a first rail having a circular cross-section and a second rail having a non-circular cross-section. Alternatively, each of the rails may have the same cross-sectional shape. In accordance with certain embodiments of the invention, the at least one rail may have a non-circular cross-section, such as a square, rectangle, elliptical, polygonal, or star-shaped cross-section.

The bridge body, in accordance with certain embodiments of the invention, may comprise at least one through-channel (e.g., reference numeral 11 in FIG. 2) and the at least one rail extends through the at least one through-channel. For example, the number of through-channels may correspond in number and cross-section with that of the number and geometry of the rail(s). By way of example, the at least one rail may include a first rail and a second rail, and the at least one through-channel may include a first through-channel and a second-through channel, in which the first rail extends completely through the first through-channel and the second rail extends completely through the second through-channel. In accordance with certain embodiments of the invention a section of the first and second rail may be overlapped and/or surrounded by the bridge body via the through-channels while a portion of the rails protrude from each side of the bridge body to which an optical device may be directly or indirectly mounted along a variety of positions along the length of the rails.

In accordance with certain embodiments of the invention, the at least one through-channel may be completely defined by the bridge body, such as illustrated in FIGS. 1 and 2. The at least one rail, for example, may be adhesively and/or mechanically secured to the bridge body at the at least one through-channel. In this regard, the relative positioning of the at least one rail may be fixed in relation to the bridge body. In accordance with certain embodiments of the invention, the at least one through-channel may be defined by the bridge body and a rail-securing component engaged to engage the bridge body. For example, the bridge body may define an upper portion of the through-channel(s) while a rail-securing component coupled to an underside of the bridge body may define a complementary portion of the through-channel(s) such that the completed through-channel(s) may be defined by the combination of both the bridge body and the rail-securing component. For example only, the at least one rail may be clamped into position between the bridge body and the rail-securing component. Additionally or alternatively, the at least one rail may include a variable cross-section including a first cross-section located at a center portion of the at least one rail and a second cross-section located at the first side portion and the second side portion, in which the first cross-section is smaller than the second cross-section and at least a portion of the center portion is engaged by the bridge body and the rail-securing component. Additionally or alternatively, the at least one rail may include a first ridge and a second ridge defining a center portion of the at least one rail, in which at least a portion of the center portion is engaged by the bridge body and the rail-securing component.

In accordance with certain embodiments of the invention, the optical bridge may comprise a rail-housing configured to receive the one or more rails, and operably engage the bridge body such that the one or more rails are indirectly engaged with the bridge body. Such embodiments, however, require an additional component (i.e., the rail-housing) that is not required when the bridge body defines the through-channel(s).

Figure 3:
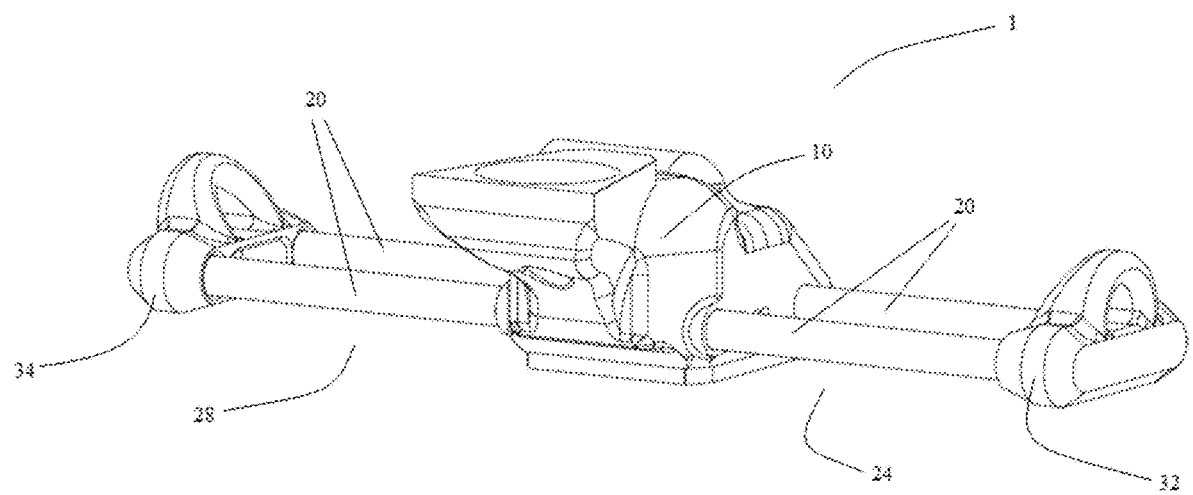
FIG. 3 illustrates an optical bridge including a lower closeout panel in accordance with certain embodiments of the invention.
Figure 4:
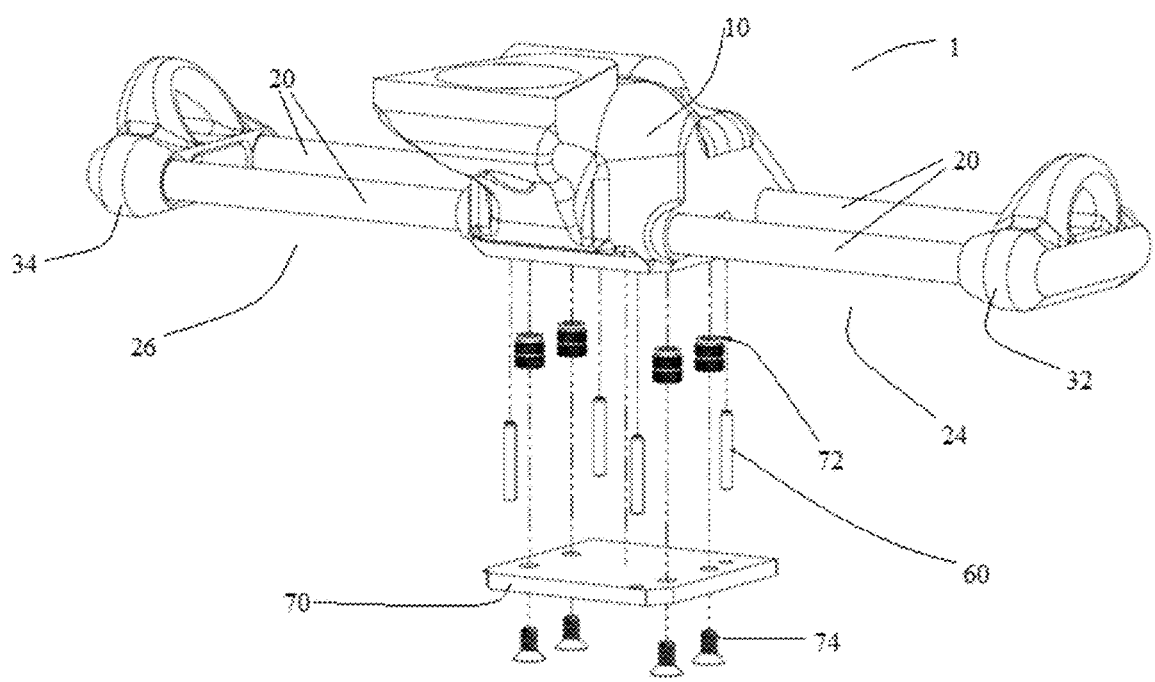
FIG. 4 illustrates and exploded view of the optical bridge of FIG. 3.
Figure 5:
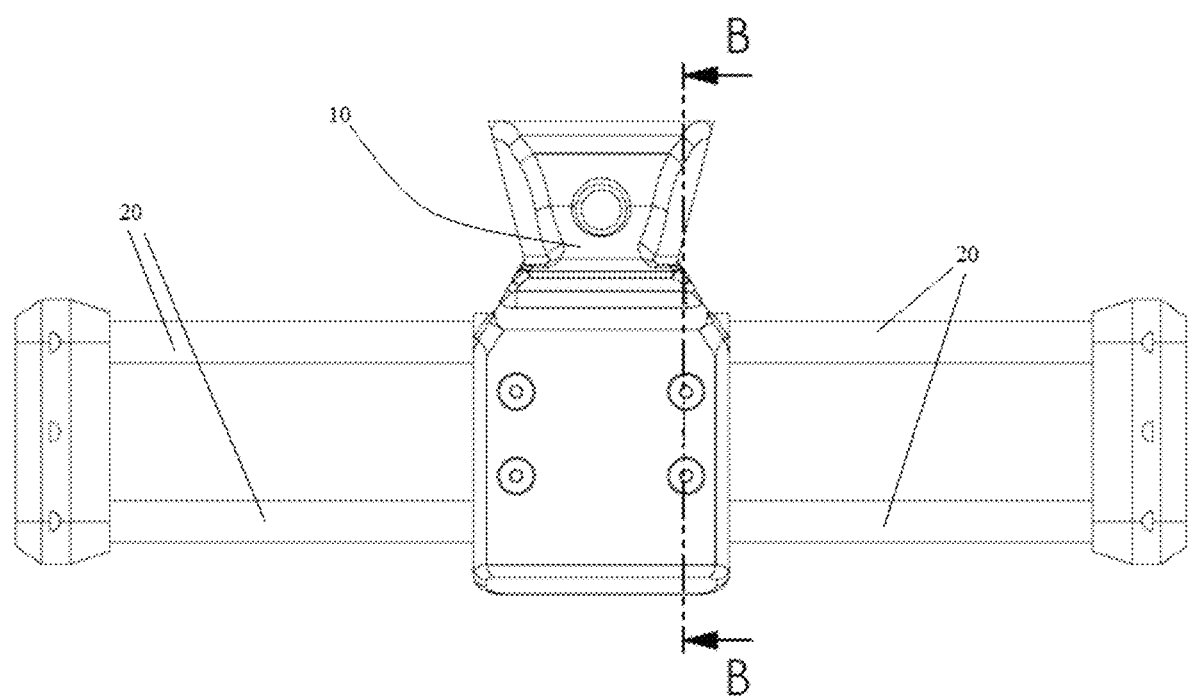
FIG. 5 illustrates a bottom view of the optical bridge of FIG. 3.
Figure 6:
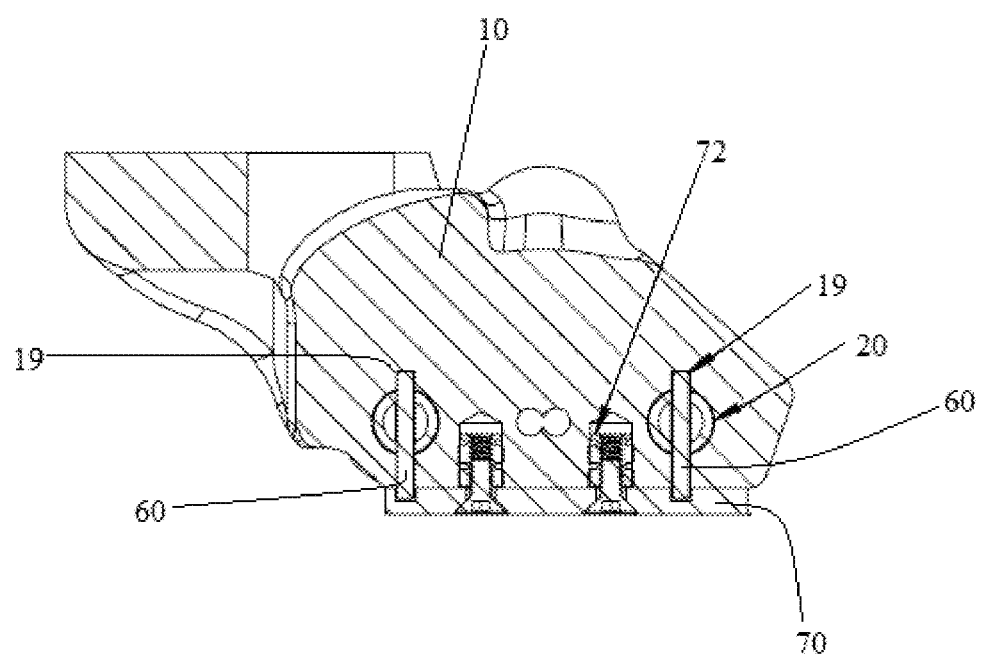
FIG. 6 illustrates a cross-sectional view of the optical bridge of FIG. 5.

Additionally or alternatively to the foregoing means of positioning and securing the at least one rail relative to the bridge body, the at least one rail may include one or more cutouts extending into a thickness of the at least one rail, such as through at least about 10%, 25%, 50%, 75% or 100% of the thickness of the at least one rail. In accordance with certain embodiments of the invention, the rail-securing component (if present) may comprise one or more protrusions configured to extend at least partially through the one or more cutouts, such as extend at least about 10%, 25%, 50%, 75% or 100% though the one or more cutouts, and where the rail-securing component may be coupled to the bridge body to affix a relative positing between the bridge body and the at least one rail. Additionally or alternatively, the bridge body may comprise a removable access panel configured to allow access to an internal compartment of the bridge body. The access panel, for example, may comprise one or more protrusions configured to extend at least partially through the one or more cutouts, such as extend at least about 10%, 25%, 50%, 75% or 100% though the one or more cutouts to affix a relative positing between the bridge body and the at least one rail. Additionally or alternatively, the bridge body 10 as illustrated by FIG. 3-6 may comprise one or more hollow cavities 19 (shown in FIG. 6) that align with the one or more cutouts when the one or more rails 20 are centered in relation to a center line of the bridge body. FIG. 3, for instance, illustrates an optical bridge 10 including a lower closeout panel 70 in accordance with certain embodiments of the invention, while FIG. 4 illustrates and exploded view of the optical bridge of FIG. 3. FIG. 5 illustrates a top view of the optical bridge of FIG. 3, and FIG. 6 illustrates a cross-sectional view of the optical bridge of FIG. 5. In such embodiments, for example, the optical bridge 10 may also include one or more pins 60 extending through the one or more hollow cavities 19 and the one or more cutouts to affix a relative positing between the bridge body 10 and the at least one rail 20. In this regard, the optical bridge 10 may also include an attachable closeout panel 70 configured to contain the one or more pins 60 in a secured position and to releasably couple to the bridge body 10 via, for example, a plurality of inserts 72 and/or screws 74.

In accordance with certain embodiments of the invention, the bridge body may further comprise a mounting portion configured to directly or indirectly engage a head-worn device. The mounting portion, for example, may be integral with the bridge body. Alternatively, the mounting portion may comprise a releasably coupled mounting plate (e.g., reference numeral 16 in FIG. 1) that directly or indirectly interfaces with both the bridge body and the head-worn device.

As noted above, the optical bridge body provides a strong yet reduced weight bridge. In this regard, the at least one rail maybe formed from a plastic material, a fiber-reinforced composite (e.g., carbon-fiber-reinforced composite), a metal (e.g., titanium, aluminum, etc.), or a metal alloy (e.g., a titanium alloy, an aluminum alloy, etc.). Additionally or alternatively, the bridge body may be formed from a plastic material, a fiber-reinforced composite (e.g., carbon-fiber-reinforced composite), a metal (e.g., titanium, aluminum, etc.), or a metal alloy (e.g., a titanium alloy, an aluminum alloy, etc.).

Figure 7:
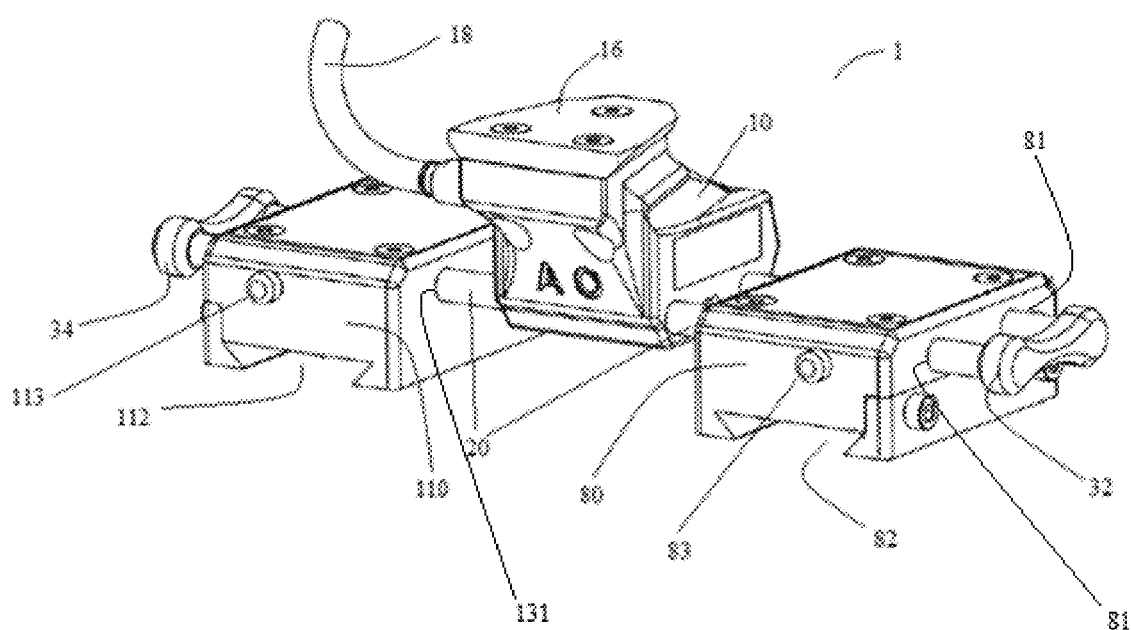
FIG. 7 illustrates an optical bridge including adapter pods configured to releasably engage one or more optical devices (e.g., one or more night vision devices) in accordance with certain embodiment of the invention.

In accordance with certain embodiments of the invention, the optical bridge may comprise one or more adapter pods slidably mounted on the one or more rails. The one or more adapter pods, for example, may comprise an interface that enables operable coupling with a wide variety of different optical devices such that one or more optical devices may be indirectly mounted to the optical bridge via the one or more adapter pods. As illustrated in FIG. 7, for instance, the optical bridge 10 may comprise a first adapter pod 80 slidably mounted (e.g., via one or more first rail-engaging channels 81) on the first side portion 24 of the at least one rail 20 and configured to engage a first optical device, a second adapter pod 110 slidably mounted (e.g., via one or more second rail-engaging channels 111) on the second side portion 28 of the at least one rail 20 and configured to engage the first optical device or a second optical device. For example, the first adapter pod 80 may include a first interface 82 configured to releasably engage an optical device, such as a night vision device, and the second adapter pod 110 (if present) may include a second interface 112 configured to releasably engage the same optical device or a separate optical device.

In accordance with certain embodiments of the invention and as illustrated by FIG. 7, the first adapter pod 80 may comprise a first position-securing device 83 configured to releasably engage the at least one rail 20 to secure the first adaptor pod 80 at a desired position along the first side portion 24 of the at least one rail. The first position-securing device 83, for example, may comprise (i) an engaged state wherein the first adapter pod 80n is releasably secured at the desired position along the first side portion 24 of the at least one rail 20, and (ii) an unengaged state wherein the first adapter pod 80 is free to slide along the first side portion 24 of the at least one rail 20. By way of example, the first position-securing device may comprise a user engageable movable lever or knob as generally illustrated in FIG. 13, which actually illustrates this feature as part of a coupled optical device. Such a position-securing device, however, may be included into the adapter pods in accordance with certain embodiments of the invention. In this regard, the user engageable movable lever or knob may be operably coupled to a rail-engaging component (e.g., stopper, screw, etc.), in which the movable lever or knob has (i) a first position corresponding to the unengaged state where the rail-engaging component is not in contact with the at least one rail, and (ii) a second position corresponding to the engaged state where the rail-engaging component is in contact with the at least one rail. Alternatively, the first position-securing device 83 may comprise a user engageable button including or operably coupled to a rail-engaging surface and a body portion as generally illustrated in FIGS. 8-10, which actually illustrate this feature as part of the coupled optical device. Such a position-securing device, however, may be included into the adapter pods in accordance with certain embodiments of the invention. In this regard, the user engageable button 85 may have (i) a depressed state corresponding to the unengaged state, and (ii) a relaxed state corresponding to the engaged state. In such embodiments, the first position-securing device 83 may comprise a first spring 88 biasing the rail-engaging surface 86 against the at least one rail 20, in which the first spring 88 is in an expanded state (e.g., indirectly exerting a force onto the at least one rail to secure the adapter pod in a fixed position) during the relaxed state of the user engageable button 85 and in a compressed state during the depressed state of the user engageable button 85 (e.g., the adapter pod is freely slidable along the at least one rail). In accordance with certain embodiments of the invention, the first position-securing device 83 may also include a second spring 89 exerting a force against the body portion 87 in a direction opposite to that of the first spring 88, in which the first spring 88 comprises a high load spring exerting a first force and the second spring 89 comprises a low load spring exerting a second force that is less than the first force. In accordance with certain embodiments of the invention and as illustrated in FIG. 11, the first position-securing device 83 may comprise a user engageable captured screw 90 that does not translate inwardly our outwardly in relation to the at least one rail 20 upon rotation of the captured screw. In this regard, the captured screw 90 may be operably coupled to a stopper 92 that translates inwardly and/or outwardly in relation to the at least one rail 20 upon the particular direction of rotation of the captured screw, in which the stopper 92 has (i) a first position corresponding to the unengaged state where the stopper is not in contact with the at least one rail, and (ii) a second position corresponding to the engaged state where the stopper is in contact with the at least one rail. As also illustrated in FIG. 11, the first position-securing device 83 may also include a spring washer (or belleville spring) 94 that adds preload and, thus friction which helps prevent the captured screw 94 from backing out due to any vibration. The first position-securing device 83 may also include a radial retaining ring (e.g., an e-clip) 96 as illustrated in FIG. 11.

In accordance with certain embodiments of the invention, the optical bridge includes a second adapter pod 110, as illustrated in FIG. 7, slidably mounted on the second side portion of the at least one rail. The second adapter pod may include a second interface 112 configured to releasably engage an optical device (e.g., a different portion of the same optical device as the first adapter pod or a completely different/separate optical device). The second adapter pod 110 may comprise a second position-securing device 113 configured to releasably engage the at least one rail 20 to secure the second adaptor pod 110 at a desired position along the second side portion of the at least one rail. The second adapter pod, in accordance with certain embodiments of the invention may be identical to that of the first adapter pod.

In accordance with certain embodiments of the invention, the second position-securing device may comprise (i) an engaged state wherein the second adapter pod is releasably secured at the desired position along the second side portion of the at least one rail, and (ii) an unengaged state wherein the second adapter pod is free to slide along the second side portion of the at least one rail. By way of example, the second position-securing device may comprise a user engageable movable lever or knob operably coupled to a rail-engaging component (e.g., stopper, screw, etc.), in which the movable lever or knob has (i) a first position corresponding to the unengaged state where the rail-engaging component is not in contact with the at least one rail, and (ii) a second position corresponding to the engaged state where the rail-engaging component is in contact with the at least one rail. Alternatively, the second position-securing device may comprise a user engageable button including or operably coupled to a rail-engaging surface and a body portion, in which the user engageable button has (i) a depressed state corresponding to the unengaged state, and (ii) a relaxed state corresponding to the engaged state. In such embodiments, the second position-securing device may comprise a first spring biasing the rail-engaging surface against the at least one rail, in which the first spring is in an expanded state (e.g., indirectly exerting a force onto the at least one rail to secure the adapter pod in a fixed position) during the relaxed state of the user engageable button and in a compressed state during the depressed state of the user engageable button (e.g., the adapter pod is freely slidable along the at least one rail). In accordance with certain embodiments of the invention, the second position-securing device may also include a second spring exerting a force against the body portion in a direction opposite to that of the first spring, in which the first spring comprises a high load spring exerting a first force and the second spring comprises a low load spring exerting a second force that is less than the first force. In accordance with certain embodiments of the invention, the second position-securing device may comprise a user engageable captured screw that does not translate inwardly our outwardly in relation to the at least one rail upon rotation of the captured screw. In this regard, the captured screw may be operably coupled to a stopper that translates inwardly and/or outwardly in relation to the at least one rail upon the particular direction of rotation of the captured screw, in which the stopper has (i) a first position corresponding to the unengaged state where the stopper is not in contact with the at least one rail, and (ii) a second position corresponding to the engaged state where the stopper is in contact with the at least one rail.

In accordance with certain embodiments of the invention, the optical bridge may include a power source, remote power supply wiring, power connectors, or any combination thereof.

In another aspect, the present invention provides a system including an optical bridge, such as those disclosed and described herein, and an optical device that is directly or indirectly coupled to the optical bridge. In accordance with certain embodiments of the invention, the optical bridge may include a bridge body configured to be mounted directly or indirectly onto a head-worn device and at least one rail operatively engaged with the bridge body, in which the at least one rail has a first end and a second end. The optical bridge may also include a first stopblock, which may be releasably attached to the at least one rail, located at or proximate to the first end and a second stopblock, which may be releasably attached to the at least one rail, located at or proximate to the second end. The at least one rail may have a first side portion located between the first stopblock and the bridge body and a second side portion located between the second stopblock and the bridge body. The optical device may be directly or indirectly mounted onto the at least one rail.

In accordance with certain embodiments of the invention, the at least one mating tunnel is integral to the optical device. In this regard, the optical device(s) may be directly mounted or coupled to the at least one rail of the optical bridge. For example, the optical device can comprise a frame that defines the at least one mating tunnel. In this regard, one or both of the stopblocks on the ends of the at least one rail may be removed to allow the optical device to slide onto the at least one rail followed by reattaching any of the removed stopblocks. Alternatively, the at least one mating tunnel comprises a door-like portion that opens to enable mounting of the optical device onto the at least one rail and closes to prevent the optical device from falling off the at least one rail. In this regard, the door-like portion includes a lock to prevent inadvertent opening of the door-like portion. Meanwhile, the stopblocks prevent the optical device from inadvertently sliding off the end of the at least one rail.

FIG. 12, for example, illustrates a system including and optical bridge 10 and an optical device 100 comprising a monocular night vision device. In this embodiment, the optical device includes an integral mating tunnel that couples the optical device to the at least one rail of the bridge. As also illustrated in FIG. 12, the optical device 100 includes a first position-securing device 83 integrated with the optical device. FIG. 13 illustrates an additional system including an optical device 100 coupled to an optical bridge along a first side portion of the at least one rail and second optical device 130 (e.g., is two separate monocular night vision devices are coupled to the optical bridge) or same optical device 100 (e.g., if the optical device comprises a night vision binocular device). FIG. 13 illustrates an embodiment in which the position-securing devices 83, 113 are integrated as part of the optical device(s) and are embodied as rotatable levers operably coupled to rail-engaging components that are either engages and secure the optical device(s) to a particular location along the rail(s) of the optical bridge or are disengaged and allow the optical device(s) to freely slide along the length of the rail(s) of the optical bridge in accordance with certain embodiments of the invention. In this regard, for example, the optical device may comprise one or more first rail-engaging channels 101 and/or one or more second rail-engaging channels 131. FIG. 14 illustrates a top view of the system of FIG. 13 that includes an optical device(s) secured to an optical bridge in accordance with certain embodiments of the invention. FIG. 15 illustrates the system of FIG. 14 in which the interpupillary distance is set to a minimum distance (e.g., the separate optical channels are closest to each other along the at least one rails) in accordance with certain embodiments of the invention. FIG. 16 illustrates the system of FIG. 14 in which the interpupillary distance is set to a maximum (e.g., the separate optical channels are farthest apart from each other along the at least one rails) in accordance with certain embodiments of the invention.

In accordance with certain embodiments of the invention, the optical device(s) may be indirectly coupled to the at least one rail of the optical bridge. For example, the system may comprise at least one mating interface component including the at least one mating tunnel, wherein the at least one mating interface component is configured to releasably couple to the optical device. The at least one mating interface component, for example, may comprise the first and/or second adapter pods described and disclosed herein. In this regard, the first and/or second adapter pods may include any and all of the features disclosed and discussed herein (e.g., respective position-securing devices, etc.). In accordance with certain embodiments of the invention, for example, the system may include (i) a first adapter pod (as described and disclosed herein) slidably mounted on or coupled to the first side portion of the at least one rail and configured to engage the optical device, (ii) a second adapter pod (as described and disclosed herein) slidably mounted on or coupled to the second side portion of the at least one rail and configured to engage the optical device or a second optical device, or both (i) and (ii). As disclosed and discussed above, the first adapter pod may include a first interface configured to releasably engage the optical device, and the second adapter pod (if present) may include a second interface configured to releasably engage the optical device or a second optical device.

In accordance with certain embodiments of the invention, the optical device may include (i) a first monocular night vision device mounted onto the at least one rail at a first position on the first side portion of the at least one rail, (ii) a second monocular night vision device mounted onto the at least one rail at a second position on the second side portion of the at least one rail, or both (i) and (ii). In accordance with certain embodiments of the invention, the optical device may comprise a night vision binocular device or a panoramic night vision device, and wherein the at least one mating tunnel overlies (i) a first portion of the at least one rail at a first side portion of the at least one rail and (ii) a second portion of the at least one rail at a second side portion of the at least one rail.

As noted above, the optical device may comprise a frame defining the at least one mating tunnel. In accordance with certain embodiments of the invention, the frame may comprise a first position-securing device configured to releasably engage the at least one rail to secure the optical device at a desired position along the first side portion of the at least one rail. In this regard, the first position-securing device of the optical device may have any structure and/or components as discussed and described above with respect to the first position-securing device of the first adapter pod. For example, the first position-securing device of the optical device may comprise (i) an engaged state wherein the optical device is releasably secured at the desired position along the first side portion of the at least one rail, and (ii) an unengaged state wherein the optical device is free to slide along the first side portion of the at least one rail. By way of example, the first position-securing device may comprise a user engageable movable lever or knob operably coupled to a rail-engaging component (e.g., stopper, screw, etc.), in which the movable lever or knob has (i) a first position corresponding to the unengaged state where the rail-engaging component is not in contact with the at least one rail, and (ii) a second position corresponding to the engaged state where the rail-engaging component is in contact with the at least one rail. Additionally or alternatively, the first position-securing device of the optical device may comprise a user engageable button including or operably coupled to a rail-engaging surface and a body portion, in which the user engageable button has (i) a depressed state corresponding to the unengaged state, and (ii) a relaxed state corresponding to the engaged state. In such embodiments, for example, the first position-securing device of the optical device may comprise a first spring biasing the rail-engaging surface against the at least one rail, in which the first spring is in an expanded state during the relaxed state of the user engageable button and in a compressed state during the depressed state of the user engageable button. In accordance with certain embodiments of the invention, the first position-securing device of the optical device may comprise a second spring exerting a force against the body portion in a direction opposite to that of the first spring, in which the first spring comprises a high load spring exerting a first force and the second spring comprises a low load spring exerting a second force that is less than the first force. Additionally or alternatively, the first position-securing device of the optical device may comprise a user engageable captured screw that does not translate inwardly our outwardly in relation to the at least one rail upon rotation of the captured screw, in which the captured screw may be operably coupled to a stopper that translates inwardly and/or outwardly in relation to the at least one rail upon a particular direction of rotation of the captured screw. In this regard, the stopper may have (i) a first position corresponding to the unengaged state where the stopper is not in contact with the at least one rail, and (ii) a second position corresponding to the engaged state where the stopper is in contact with the at least one rail.

In accordance with certain embodiments of the invention, the frame of the optical device may include a second position-securing device configured to releasably engage the at least one rail to secure the optical device at a desired position along the second side portion of the at least one rail. In this regard, the second position-securing device of the optical device may have any structure and/or components as discussed and described above with respect to the second position-securing device of the second adapter pod. For example, the second position-securing device of the optical device may comprise (i) an engaged state wherein the optical device is releasably secured at the desired position along the second side portion of the at least one rail, and (ii) an unengaged state wherein the optical device is free to slide along the second side portion of the at least one rail. By way of example, the second position-securing device may comprise a user engageable movable lever or knob operably coupled to a rail-engaging component (e.g., stopper, screw, etc.), in which the movable lever or knob has (i) a first position corresponding to the unengaged state where the rail-engaging component is not in contact with the at least one rail, and (ii) a second position corresponding to the engaged state where the rail-engaging component is in contact with the at least one rail. Additionally or alternatively, the second position-securing device of the optical device may comprise a user engageable button including or operably coupled to a rail-engaging surface and a body portion, in which the user engageable button has (i) a depressed state corresponding to the unengaged state, and (ii) a relaxed state corresponding to the engaged state. In such embodiments, for example, the second position-securing device of the optical device may comprise a first spring biasing the rail-engaging surface against the at least one rail, in which the first spring is in an expanded state during the relaxed state of the user engageable button and in a compressed state during the depressed state of the user engageable button. In accordance with certain embodiments of the invention, the second position-securing device of the optical device may comprise a second spring exerting a force against the body portion in a direction opposite to that of the first spring, in which the first spring comprises a high load spring exerting a first force and the second spring comprises a low load spring exerting a second force that is less than the first force. Additionally or alternatively, the second position-securing device of the optical device may comprise a user engageable captured screw that does not translate inwardly our outwardly in relation to the at least one rail upon rotation of the captured screw, in which the captured screw may be operably coupled to a stopper that translates inwardly and/or outwardly in relation to the at least one rail upon a particular direction of rotation of the captured screw. In this regard, the stopper may have (i) a first position corresponding to the unengaged state where the stopper is not in contact with the at least one rail, and (ii) a second position corresponding to the engaged state where the stopper is in contact with the at least one rail.

In accordance with certain embodiments of the invention, the optical bridge of the system may include a power source, remote power supply wiring, power connectors, or any combination thereof.

In accordance with certain embodiments of the invention, the interpupillary distance between two optical channels, whether as part of a single optical device or two separate monocular devices, may be readily adjusted by sliding one or more of the optical channels along a respective portion of the at least one rail and securing each of the optical channels at the desired interpupillary distance for a given user, which may be readily adjusted for a subsequent user by adjusting the respective position(s) of the optical channels to define a new interpupillary distance associated with the subsequent user.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. An optical bridge, comprising:
   (i) a bridge body configured to be mounted directly or indirectly onto a head-worn device;
   (ii) at least one rail operatively engaged with the bridge body, the at least one rail having a first end and a second end;
   (iii) a first stopblock located at or proximate to the first end; and
   (iv) a second stopblock located at or proximate to the second end; wherein the at least one rail has a first side portion located between the first stopblock and the bridge body and a second side portion located between the second stopblock and the bridge body;
   (v) a first adapter pod slidably mounted on the first side portion of the at least one rail and configured to engage a first optical device, a second adapter pod slidably mounted on the second side portion of the at least one rail and configured to engage the first optical device, a second optical device, or both;
   (vi) the first adapter pod comprises a first position-securing device configured to releasably engage the at least one rail to secure the first adaptor pod at a desired position along the first side portion of the at least one rail, and the second adapter pod comprises a second position-securing device configured to releasably engage the at least one rail to secure the second adaptor pod at a desired position along the second side portion of the at least one rail;

(vii) the first position-securing device and the second position-securing device each comprise (a) an engaged state wherein the respective adapter pod is releasably secured at the desired position along the respective side portion of the at least one rail, and (b) an unengaged state wherein the respective adapter pod is free to slide along the respective side portion of the at least one rail; and (viii) the first position-securing device, the second position-securing device, or both comprise a user engageable button including or operably coupled to a rail-engaging surface and a body portion, wherein the user engageable button has (a) a depressed state corresponding to the unengaged state, and (b) a relaxed state corresponding to the engaged state.

2. The optical bridge of claim 1, wherein the at least one rail may comprise from 1 to about 5 rails.

3. The optical bridge of claim 1, wherein the bridge body comprises at least one through-channel and the at least one rail extends through the at least one through-channel.

4. The optical bridge of claim 3, wherein the at least one through-channels are completely defined by the bridge body.

5. The optical bride of claim 3, wherein the at least one rail is adhesively and/or secured to the bridge body at the at least one through-channel.

6. The optical bridge of claim 1, wherein the at least one rail is formed from a plastic material, a fiber-reinforced composite, a metal, or a metal alloy.

7. The optical bridge of claim 1, wherein the bridge body is formed from a plastic material, a fiber-reinforced composite, a metal, or a metal alloy.

8. The optical bridge of claim 1, further comprising a power source, remote power supply wiring, power connectors, or any combination thereof.

9. A system, comprising:
(A) an optical bridge according to claim 1; and
(B) an optical device mounted onto the at least one rail via the first adapter pod, the second adapter pod, or both.

10. The system of claim 9, wherein the optical device includes (i) a first monocular night vision device mounted onto the at least one rail at a first position on the first side portion of the at least one rail, (ii) a second monocular night vision device mounted onto the at least one rail at a second position on the second side portion of the at least one rail, or both (i) and (ii).

11. The system of claim 9, wherein the optical device includes a night vision binocular device or a panoramic night vision device.

12. The optical bridge of claim 1, wherein the bridge body includes a conductive element.

13. An optical bridge, comprising:
(i) a bridge body configured to be mounted directly or indirectly onto a head-worn device;
(ii) at least one rail operatively engaged with the bridge body, the at least one rail having a first end and a second end;
(iii) a first stopblock located at or proximate to the first end; and
(iv) a second stopblock located at or proximate to the second end; wherein the at least one rail has a first side portion located between the first stopblock and the bridge body and a second side portion located between the second stopblock and the bridge body;

(v) a first adapter pod slidably mounted on the first side portion of the at least one rail and configured to engage a first optical device, a second adapter pod slidably mounted on the second side portion of the at least one rail and configured to engage the first optical device, a second optical device, or both;

(vi) the first adapter pod comprises a first position-securing device configured to releasably engage the at least one rail to secure the first adaptor pod at a desired position along the first side portion of the at least one rail, and the second adapter pod comprises a second position-securing device configured to releasably engage the at least one rail to secure the second adaptor pod at a desired position along the second side portion of the at least one rail;

(vii) the first position-securing device and the second position-securing device each comprise (a) an engaged state wherein the respective adapter pod is releasably secured at the desired position along the respective side portion of the at least one rail, and (b) an unengaged state wherein the respective adapter pod is free to slide along the respective side portion of the at least one rail; and (viii) the first position-securing device, the second position-securing device, or both comprise a user engageable captured screw that does not translate inwardly our outwardly in relation to the at least one rail upon rotation of the captured screw, the captured screw being operably coupled to a stopper that translates inwardly and/or outwardly in relation to the at least one rail upon rotation of the captured screw, wherein stopper has (a) a first position corresponding to the unengaged state where the stopper is not in contact with the at least one rail, and (b) a second position corresponding to the engaged state where the stopper is in contact with the at least one rail.

14. The optical bridge of claim 13, wherein the at least one rail may comprise from 1 to about 5 rails.

15. The optical bridge of claim 13, wherein the bridge body comprises at least one through-channel and the at least one rail extends through the at least one through-channel.

16. The optical bridge of claim 15, wherein the at least one through-channels are completely defined by the bridge body.

17. The optical bride of claim 15, wherein the at least one rail is adhesively and/or secured to the bridge body at the at least one through-channel.

18. The optical bridge of claim 13, wherein the at least one rail is formed from a plastic material, a fiber-reinforced composite, a metal, or a metal alloy.

19. The optical bridge of claim 13, wherein the bridge body is formed from a plastic material, a fiber-reinforced composite, a metal, or a metal alloy.

20. The optical bridge of claim 13, further comprising a power source, remote power supply wiring, power connectors, or any combination thereof.

21. A system, comprising:
(A) an optical bridge according to claim 13; and
(B) an optical device mounted onto the at least one rail via the first adapter pod, the second adapter pod, or both.

22. The system of claim 21, wherein the optical device includes (i) a first monocular night vision device mounted onto the at least one rail at a first position on the first side portion of the at least one rail, (ii) a second monocular night vision device mounted onto the at least one rail at a second position on the second side portion of the at least one rail, or both (i) and (ii).

23. The system of claim 21, wherein the optical device includes a night vision binocular device or a panoramic night vision device.

24. An optical bridge, comprising:
(i) a bridge body configured to be mounted directly or indirectly onto a head-worn device;
(ii) at least one rail operatively engaged with the bridge body, the at least one rail having a first end and a second end;
(iii) a first stopblock located at or proximate to the first end; and
(iv) a second stopblock located at or proximate to the second end; wherein the at least one rail has a first side portion located between the first stopblock and the bridge body and a second side portion located between the second stopblock and the bridge body;
(v) a first adapter pod slidably mounted on the first side portion of the at least one rail and configured to engage a first optical device, a second adapter pod slidably mounted on the second side portion of the at least one rail and configured to engage the first optical device, a second optical device, or both;
(vi) the first adapter pod comprises a first position-securing device configured to releasably engage the at least one rail to secure the first adaptor pod at a desired position along the first side portion of the at least one rail, and the second adapter pod comprises a second position-securing device configured to releasably engage the at least one rail to secure the second adaptor pod at a desired position along the second side portion of the at least one rail;
(vii) the first position-securing device and the second position-securing device each comprise (a) an engaged state wherein the respective adapter pod is releasably secured at the desired position along the respective side portion of the at least one rail, and (b) an unengaged state wherein the respective adapter pod is free to slide along the respective side portion of the at least one rail; and
(viii) the first position-securing device, the second position-securing device, or both comprise a user engageable movable lever or knob operably coupled to a rail-engaging component, wherein the movable lever or knob has (a) a first position corresponding to the unengaged state where the rail-engaging component is not in contact with the at least one rail, and (b) a second position corresponding to the engaged state where the rail-engaging component is in contact with the at least one rail.

25. The optical bridge of claim 24, wherein the at least one rail may comprise from 1 to about 5 rails.

26. The optical bridge of claim 24, wherein the bridge body comprises at least one through-channel and the at least one rail extends through the at least one through-channel.

27. The optical bridge of claim 26, wherein the at least one through-channels are completely defined by the bridge body.

28. The optical bride of claim 26, wherein the at least one rail is adhesively and/or secured to the bridge body at the at least one through-channel.

29. The optical bridge of claim 24, wherein the at least one rail is formed from a plastic material, a fiber-reinforced composite, a metal, or a metal alloy.

30. The optical bridge of claim 24, wherein the bridge body is formed from a plastic material, a fiber-reinforced composite, a metal, or a metal alloy.

31. The optical bridge of claim 24, further comprising a power source, remote power supply wiring, power connectors, or any combination thereof.

32. A system, comprising:
(A) an optical bridge according to claim 24; and
(B) an optical device mounted onto the at least one rail via the first adapter pod, the second adapter pod, or both.

33. The system of claim 32, wherein the optical device includes (i) a first monocular night vision device mounted onto the at least one rail at a first position on the first side portion of the at least one rail, (ii) a second monocular night vision device mounted onto the at least one rail at a second position on the second side portion of the at least one rail, or both (i) and (ii).

34. The system of claim 32, wherein the optical device includes a night vision binocular device or a panoramic night vision device.

* * * * *